(12) United States Patent
Lee et al.

(10) Patent No.: US 8,378,517 B2
(45) Date of Patent: Feb. 19, 2013

(54) WIND-HYDRO POWER GENERATING SYSTEM AND METHOD

(76) Inventors: Koo-Shik Lee, Seoul (KR); Dae Hoon Lee, Seoul (KR)

(*) Notice: Subject to any disclaimer, the term of this patent is extended or adjusted under 35 U.S.C. 154(b) by 316 days.

(21) Appl. No.: 12/734,997

(22) PCT Filed: Dec. 8, 2008

(86) PCT No.: PCT/KR2008/007240
§ 371 (c)(1),
(2), (4) Date: Jun. 9, 2010

(87) PCT Pub. No.: WO2009/078612
PCT Pub. Date: Jun. 25, 2009

(65) Prior Publication Data
US 2010/0289264 A1    Nov. 18, 2010

(30) Foreign Application Priority Data
Dec. 14, 2007    (KR) .................. 10-2007-0130635

(51) Int. Cl.
*F03B 13/00*    (2006.01)
(52) U.S. Cl. .................................. 290/54; 290/55
(58) Field of Classification Search .......... 290/54; 415/5
See application file for complete search history.

(56) References Cited

U.S. PATENT DOCUMENTS

| | | | | |
|---|---|---|---|---|
| 1,481,397 A | * | 1/1924 | Tetetleni | 415/4.1 |
| 3,927,330 A | * | 12/1975 | Skorupinski | 290/54 |
| 4,292,535 A | * | 9/1981 | Diggs | 290/54 |
| 6,809,430 B2 | * | 10/2004 | Diederich | 290/54 |
| 7,785,065 B2 | * | 8/2010 | Clemens | 415/5 |

FOREIGN PATENT DOCUMENTS

| | | | |
|---|---|---|---|
| JP | 53109045 A | * | 9/1978 |
| JP | 57151074 A | * | 9/1982 |
| JP | 64013273 U | * | 1/1989 |
| JP | 2004138015 A | * | 5/2004 |
| KR | 20030035743 A | * | 5/2003 |
| WO | WO 0040859 A1 | * | 6/2000 |

* cited by examiner

*Primary Examiner* — Joseph Waks
(74) *Attorney, Agent, or Firm* — Bacon & Thomas, PLLC

(57) ABSTRACT

A wind-hydro power generation system and its power generation method which use both wind power and hydraulic power. Increasing the size of a hydraulic turbine for the hydraulic power generation may result in the decreased rotation power of the hydraulic turbine caused by the resistance of the wind when blades on the hydraulic turbine come out of the water. A blade rotation system on the blades of the hydraulic turbine is provided so that the blades may rotate according to the direction of the wind. As a result, wind resistance is not effected to the rotation of the hydraulic turbine even when the blades on the hydraulic turbine are out of water, but enhances the rotation power of the hydraulic turbine, which enables the use of wind power and hydraulic power at the same time.

2 Claims, 4 Drawing Sheets

WIND-HYDRO POWER GENERATING SYSTEM AND METHOD

TECHNICAL FIELD

The present invention relates to an improved system and method for hydraulic power generation, and more particularly to a system which can also use the wind power to generate electric power.

BACKGROUND ART

A hydraulic power generation system which includes a hydraulic turbine comprising a caterpillar track; a rotatable body which includes several of blade holders connected to the caterpillar; and blades installed on the blade holder of the rotatable body, and a generator installed on the hydraulic turbine is already known from Korean Patent No. 534546 which is invented by the inventor of the present invention.

The blades which are installed on the blade holder rotate along the track by the force of the water and when they come out of the water the blades are resisted by the wind especially when a strong wind blows. The above hydraulic power generation system requires an increase of the size of the wind blade, which results in significant resistance force from the wind blowing from the opposite direction or lateral direction when the direction of the wind is different from the rotation direction along with the track.

A wind power generation system is also already known. See Korean Patent No. 455087 which is invented by the inventor of the present invention, such wind power generation system rotates the blades according to the direction of the wind by a blade rotating system. However, such wind power generation system cannot be used as a hydraulic power generation system so that the wind power generation system and hydraulic power generation system are used separately.

DISCLOSURE OF INVENTION

Technical Problem

The primary object of the present invention is to provide wind-hydro power generation system and method which can use wind power and hydraulic power at the same time to generate electric power. The present invention provides a hydraulic power generation system which can also use wind power to increase efficiency of the hydraulic power generation by increasing the rotation power of the hydraulic turbine by adding the effect of the wind power instead of the resistance from the wind when the emersed blades come out of the water.

Technical Solution

In order to solve the above problem, the present invention includes a blade rotation system which rotates blades so that the blades can be adjusted according to the direction of the wind. By combining such blade rotation system with the hydraulic power generation system, the above problem can be solved. By installing the blade rotation system on the blades of the hydraulic turbine as the wind power generation system, the present invention provides wind-hydro power generation system and method.

Advantageous Effects

The present invention does not allow resistance caused by the wind even when the blade of the hydraulic turbine is out of water, but the wind power adds the force to the rotation of the hydraulic turbine. As a result, the present invention provides hydraulic power generation system with the wind power generation system to enhance the power generation efficiency of the hydraulic power generation system.

DETAILED DISCUSSION IN CONJUNCTION WITH THE DRAWINGS

Figure 1:
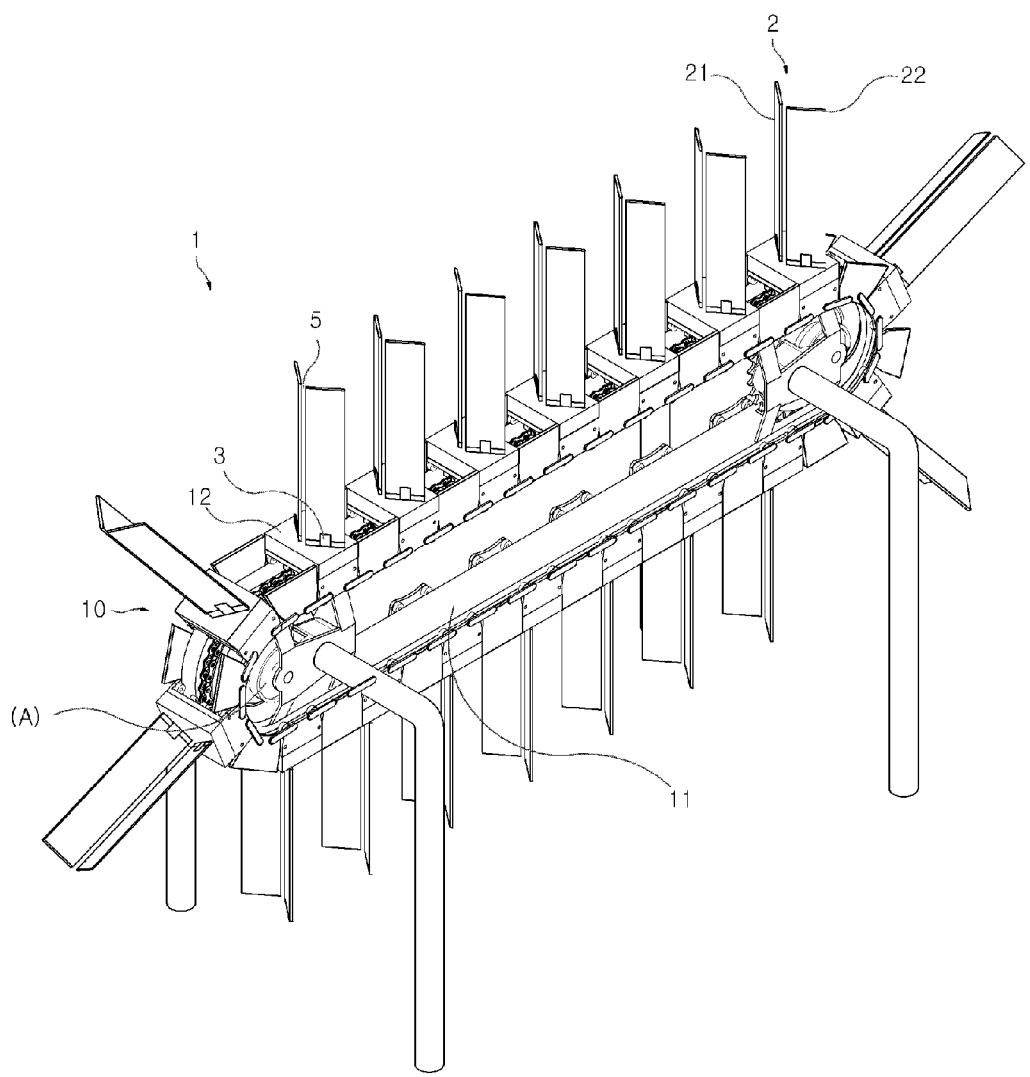
FIG. 1 is a view showing that the rotation system on the wind blade is not affected by a mild wind or when there is no wind.

The followings are detailed descriptions about the present invention with the attached drawings. The attached drawings for the present invention show the technological structures of the present invention, and the present invention is not limited to the embodiment as shown in the drawings, but it is limited according to the appended claims.

The present wind-hydro power generation system includes a hydraulic turbine (I) and a generator installed with the hydraulic turbine (I). The hydraulic turbine (I) includes a rotatable body (10) which comprises a caterpillar track (11) and a number of blade holders (12), which are installed on the caterpillar track (11). The blade holders (12) include blades (2), wherein the present invention provides further the system which includes a blade combination system (3) which connects the blades (2) to the blade holders (12) by axial mechanism.

Figure 4:
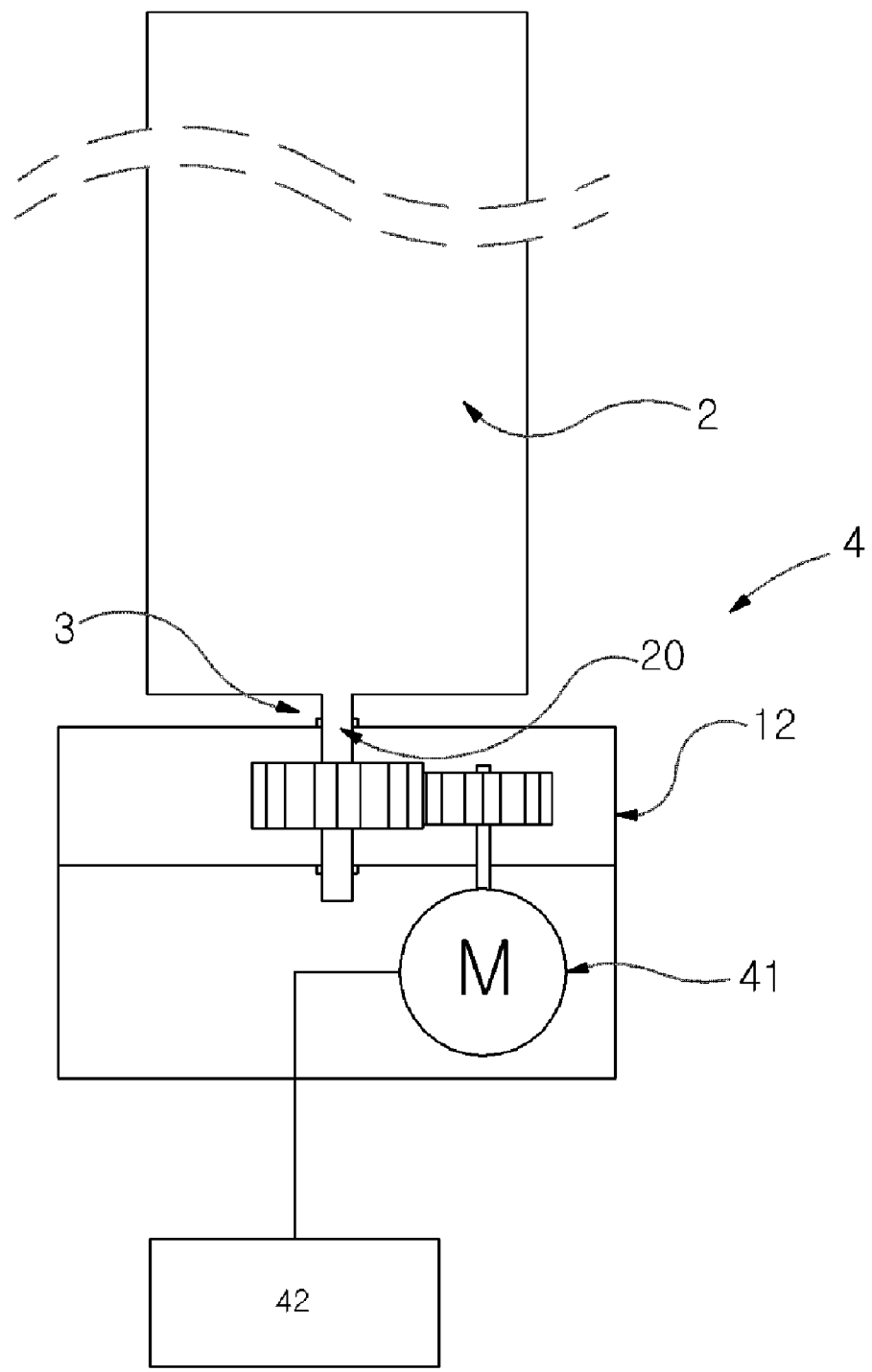
FIG. 4 is a view showing the blade rotation system.

The axial combination system (3) includes a further blade rotation system (4) (FIG. 4) to rotate the blades (2) to provide further wind power generation system effect.

The axial combination system (3) connects the blades (2) axially to the blade holder (12). The blade rotation system (4) can use a sail-direction control system as shown in the Patent No. 455087 which is invented by the same inventor of the present invention. The blade rotation system (4) comprises the motor (41) which rotates the axle (20) of the blades (2) and a control system (42) which controls the motor (41) as shown on the attached drawings.

Furthermore, the present invention provides a wind-hydro power generation system which has the water outflow (5) at the center by distributing the blades (2) to the right side and left side. The divided wind blades (21, 22) may include a blade rotation system (4).

Figure 2:
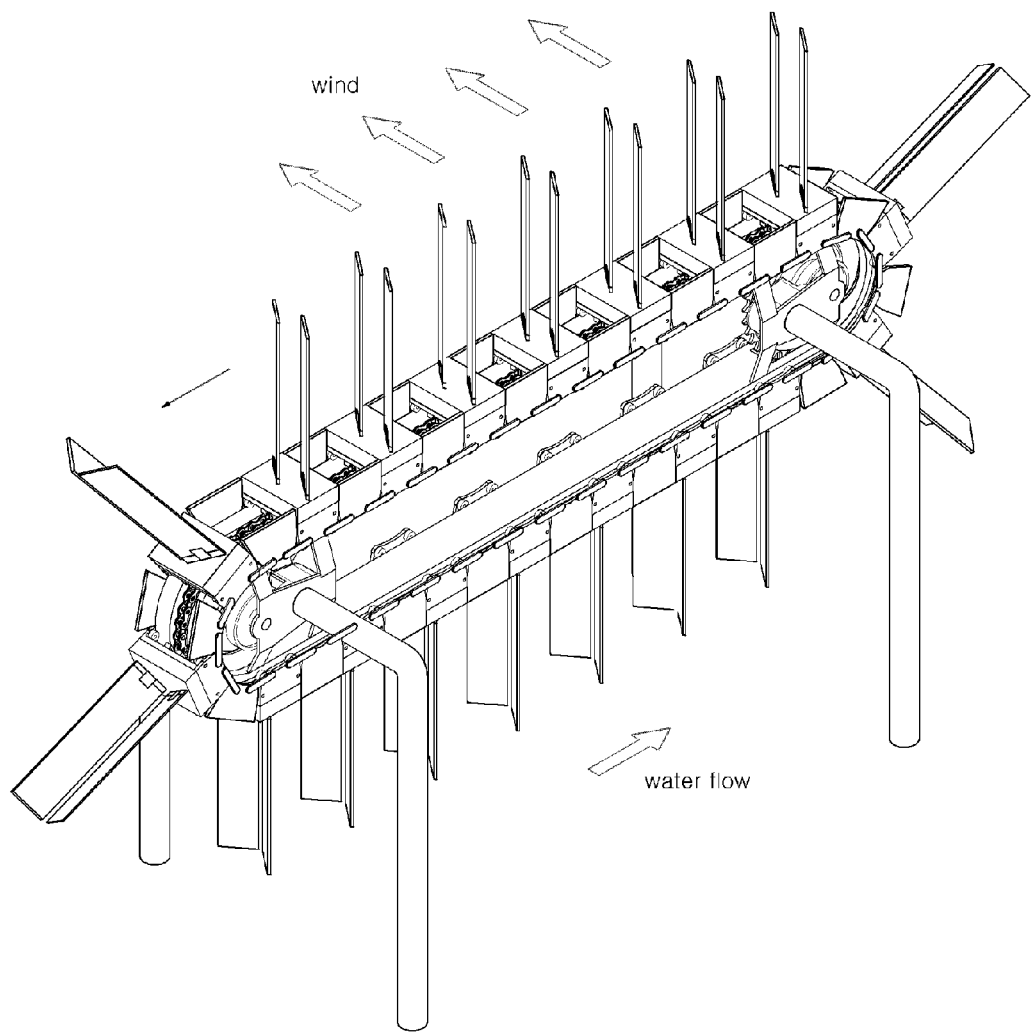
FIG. 2 is a view showing the generation method of the present invention. It also shows the setting of the direction of the wind blade according to the direction of the wind in the air.

As shown on FIG. 2, the present invention activates the control system (42) when the wind blows in the direction of the arrows to position the wind blade (21, 22) to 20-30 degrees and enhances the rotation of the hydraulic turbine (1).

The present invention can also transform the blades (21, 22) to a depressed form against the direction of the flow of water when the blades (21, 22) are submerged, which create the water outflow (5) at the center to enhance the efficiency of the use of the water power. The present invention can easily change the direction of the blades (21, 22) when they are used for the tidal power generation.

Figure 3:
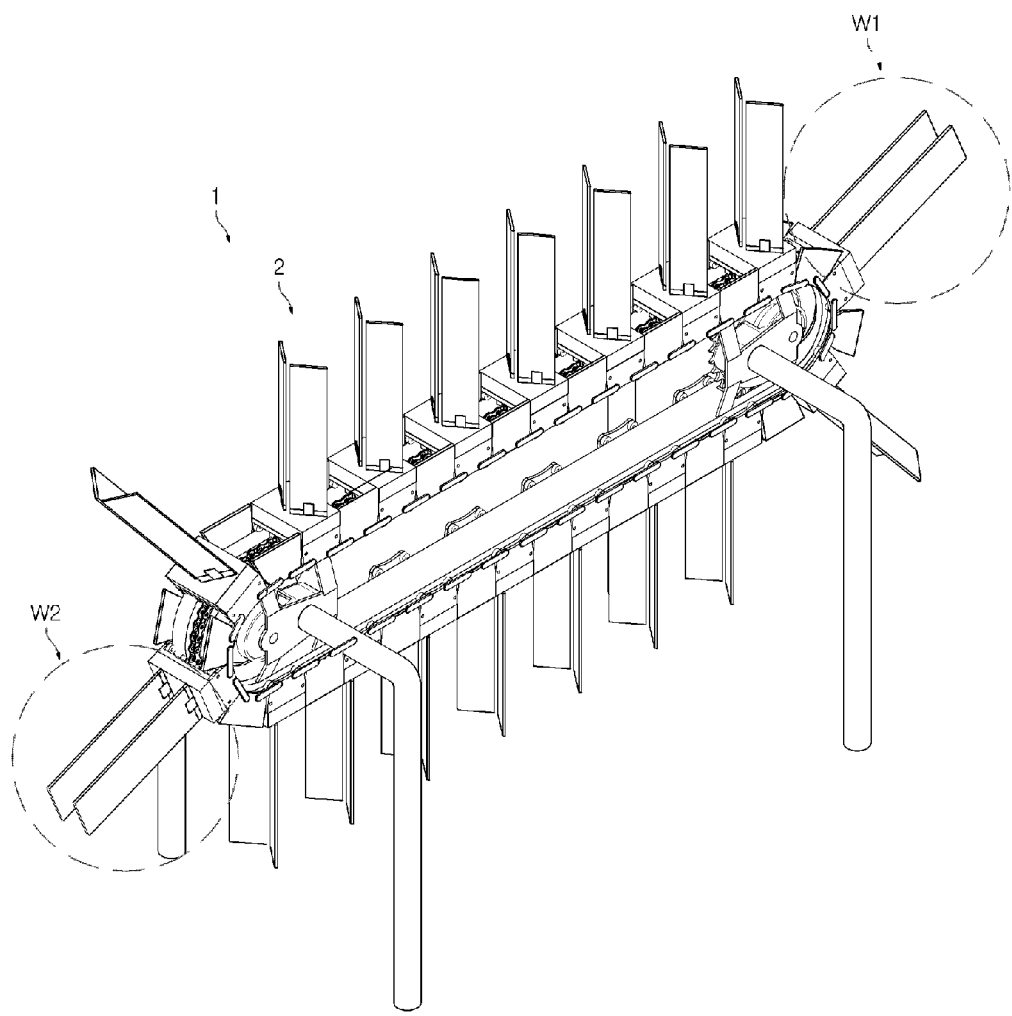
FIG. 3 is a view showing the generation method of the present invention. It also shows the installation status of the blades at the time of the inflow and outflow of water.

Furthermore, as shown in W1 and W2 of FIG. 3, the present invention provides the system wherein the system includes the control system (42) which rotates the blades (21, 22) when the blades (21, 22) are submerged or out of water so that the blades (21, 22) are perpendicularly positioned to the flow of the water to reduce the resistance during the inflow and outflow of water and prevents the waste of the rotation power of the hydraulic turbine (1).

The invention claimed is:

1. A wind-hydro power generation method, generating by using a hydraulic turbine which includes a rotatable body, said rotatable body includes caterpillar track, and a plurality of blade holder connected to the caterpillar track,
the method comprising the steps of:
installing a generator with the hydraulic turbine;
distributing the blades to the right side and left side on the blade holder with an axial combination system;
the axial combination system includes blade rotation system which rotates the blades, and the two blades form a depressed form against the direction of the flow of water when the blades are submerged in the water to create water outflow between the blades; and,
enhancing the rotation power of the hydraulic turbine with the wind power when the blades are out of the water, by changing the direction of the blades against the wind by the blade rotation system.

2. The wind-hydro power generation method as claimed in claim 1, wherein:
the blade rotation system includes the control system which rotates the blades when the blades are in the water or out of the water so that the blades are perpendicularly positioned to the flow of the water to reduce the resistance during the inflow and outflow of water and prevents the waste of the rotation power of the said hydraulic turbine.

* * * * *